United States Patent [19]

Shirota et al.

[11] Patent Number: 4,919,911

[45] Date of Patent: Apr. 24, 1990

[54] METHOD OF RECOVERING A LITHIUM CHLORIDE

[75] Inventors: Daigo Shirota; Masao Omori, both of Ichihara; Hiroyasu Yamato; Norio Ogata, both of Sodegaura, all of Japan

[73] Assignee: Idemitsu Petrochemical Company Limited, Tokyo, Japan

[21] Appl. No.: 285,031

[22] Filed: Dec. 16, 1988

[30] Foreign Application Priority Data

Dec. 19, 1987 [JP] Japan .................................. 62-322494
Nov. 1, 1988 [JP] Japan .................................. 63-276745

[51] Int. Cl.$^5$ .................... C01D 3/04; C08G 75/16
[52] U.S. Cl. .................................. 423/499; 528/388
[58] Field of Search ................ 423/499; 502/224; 260/695; 526/69, 71; 528/293, 299, 388; 210/770

[56] References Cited

U.S. PATENT DOCUMENTS

| | | | |
|---|---|---|---|
| 4,769,442 | 9/1988 | Iwasaki et al. | 528/388 |
| 4,810,773 | 3/1989 | Ogata et al. | 528/388 |
| 4,840,986 | 6/1989 | Inoue et al. | 528/388 |

FOREIGN PATENT DOCUMENTS

| | | | |
|---|---|---|---|
| 9202222 | 4/1983 | Japan | 528/388 |
| 59-202222 | 11/1984 | Japan . | |
| 2253622 | 4/1986 | Japan | 528/388 |

Primary Examiner—Jeffrey E. Russel
Assistant Examiner—Brian M. Bolam

[57] ABSTRACT

The present invention provides a method of recovering a lithium chloride, which comprises reacting a dihalogenated aromatic compound and an alkali metal sulfide and/or alkali metal hydrogen sulfide in a polar solvent under the pressure of lithium chloride, separating a solvent insoluble component from the resultant reaction mixture to obtain a solution, and calcinating a residue obtained by removing volatile substances from the resultant solution, as well as a method of recovering a lithium chloride, which comprises reacting a dihalogenated aromatic compound and an alkali metal sulfide and/or alkali metal hydrogen sulfide in a polar solvent under the pressure of lithium chloride, separating the granular polymer ingredient from the resultant reaction mixture subjecting the liquid suspension obtained by said separation to solid-liquid separation and calcinating the residue obtained by removing volatile substances from the resultant solution component.

10 Claims, No Drawings

METHOD OF RECOVERING A LITHIUM CHLORIDE

BACKGROUND OF THE INVENTION

1. Field of the Invention

The present invention pertains to a method of recovering lithium chloride. More specifically, the present invention pertains to a method of economically and efficiently recovering a lithium chloride which is used as a polymerization agent in the production of polyarylene sulfides.

2. Description of the Prior Art

Polyarylene sulfides having a structure in which phenylene groups are chained by way of thioether bondings are generally used in various fields, such engineering plastics, because of their excellent mechanical properties, chemical resistance, heat resistance, etc.

These polyarylene sulfides are produced by reacting a dihalogenated aromatic compound and an alkali metal sulfide in a polar solvent.

If a lithium salt such as lithium chloride is used as a polymerization agent, a white polyarylene sulfide with less salt content can be obtained at high degrees of polymerization, and a polyarylene sulfide of optional molecular weight can be obtained.

However, since lithium chloride is expensive, it is necessary to recover and reuse the same in order to lower the cost of producing polyarylene sulfide, and it has also been desired to use a recovery method therefore, which is simple.

Although lithium may function as polymerization agents to the same extent as lithium chloride, it is difficult to recover them.

Heretofore, as the method of recovering the lithium salt from a reaction mixture of polyarylene sulfide, it has been known, to remove the solvent from the reaction mixture, wash the solid obtained therefrom with an aqueous solution of an acid such as dilute hydrochloric acid and blowing carbon dioxide into the washing solution or adding a carbonate such as sodium carbonate to deposit lithium carbonate, and filtering to recover lithium carbonate. Alternatively, hydrochloric acid may be added to the lithium carbonate, followed by evaporation to dry the resultant aqueous solution to recover lithium chloride (refer to Japanese Patent Laid-Open No. 202222/1984).

However, this method is difficult in that: (1) the recovery procedures are complicated and require complicated recovery facilities and a great amount of carbonate, etc. for depositing lithium carbonate; (2) direct and simple recovery of lithium chloride, if it is used as the lithium salt for the polymerization agent, is substantially impossible, and (3) unreacted oligomers or impurities are incorporated into the resultant polyarylene sulfide to reduce the quality thereof.

SUMMARY OF THE INVENTION

The object of the present invention is to provide a method of recovering lithium chloride that is used as a polymerization agent, and recover the lithium chloride efficiently at a high purity and high recovery rate by a simple operation.

The first feature of the invention is a method of recovering lithium chloride comprising reacting a dihalogenated aromatic compound and an alkaline metal sulfide and/or alkaline metal hydrogen sulfide in the presence of lithium chloride in a polar solvent, separating the solvent-insoluble component from the resultant reaction mixture to obtain a solution, and calcinating the residue obtained by separating volatile substances from the solution.

The second feature of the invention is a method of recovering lithium chloride comprising reacting a dihalogenated aromatic compound and an alkali metal sulfide and/or alkali hydrogen sulfide in a polar solvent in the presence of lithium chloride, separating the granular polymer ingredient from the resultant reaction mixture, subjecting the liquid suspension obtained by said separation to solid-liquid separation and calcinating the residue obtained by removing Volatile substances from the resultant solution component.

DESCRIPTION OF THE PREFERRED EMBODIMENT

In the present invention, a reaction mixture obtained by reacting a dihalogenated aromatic compound and an alkali metal sulfide and/or alkali metal hydrogen sulfide in the presence of lithium chloride in a polar solvent is used to recover lithium chloride. A solvent insoluble component is separated from the reaction mixture to obtain a solution and volatile substances are removed from the solution to obtain a calcined residue.

(a) The dihalogenated aromatic compounds usable as the starting monomer in the process according to the present invention can include, dihalobenzenes such as m-dihalobenzene and p-dihalobenzene; alkyl-substituted dihalobenzenes or cycloalkyl substituted dihalobenzenes such as 2,3-dihalotoluene, 2,5-dihalotoluene, 2,6-dihalotoluene, 3-4-dihalotoluene, 2,5-dihaloxylene, 1-ethyl-2,5-dihalobenzene, 1,2,4-tetramethyl-3,6-dihalobenzene, 1-n-hexyl-2,5-dihalobenzene, 1-cyclohexyl-2,5-dihalobenzene, etc.; aryl-substituted dihalobenzenes such as 1-phenyl-2,5-dihalobenzene, 1-benzyl-2,5-dihalobenzene and 1-p-toluyl-2,5-dihalobenzene; dihalobiphenyls such as 4,4-dihalobiphenyl; dihalonaphthalenes such as 1,4-dihalonaphthalene, 1,6-dihalonaphthalene and 2,6-dihalonaphthalene; and 3,5-dihalobenzoate, 4,4'-dihalodiphenylsulfide and 4,4'-dihalodiphenylsulfoxide.

The halogen elements in these dihalogenated aromatic compounds are, respectively, fluorine, chlorine, bromine or iodine, which may be identical or different with each other.

Among the dihalogenated aromatic compounds described above, dihalobenzenes are preferred, and the dihalobenzenes containing mainly p-dichlorobenzene are particularly preferred.

In the present invention, the dihalogenated aromatic compounds may be used alone or two or more of them may be used in combination. In addition, other dihalogenated aromatic compounds, for example, dihalogenated aromatic carboxylic acids or alkali metal salts thereof may be used together.

In addition to said dihalogenated aromatic compounds, if necessary, branching agents such as trihalobenzene, dihaloaniline and dihalonitrobenzene and molecular weight modifiers such as monohalobenzene, thiophenol, phenol and aniline may be used.

(b) Alkali Metal Sulfide and Alkali Metal Hydrogen Sulfide

In the process of the present invention, alkali metal sulfides and/or alkali metal hydrogen sulfides (alkali metal sulfides and/or alkali metal hydrogen sulfides, hereinafter referred to simply as alkali metal (hydrogen)

sulfide) may be used as a sulfur source for the polyarylene sulfides.

As the alkali metal sulfides described above, there can be mentioned, for example, lithium sulfide, sodium sulfide, potassium sulfide, rubidium sulfide and lithium sulfide.

Sodium sulfide and lithium sulfide are preferred, and sodium sulfide is particularly preferred.

As the alkali metal hydrogen sulfides described above, there can be mentioned, for example, lithium hydrogen sulfide (LiHS), sodium hydrogen sulfide (NaHS), potassium hydrogen sulfide (KHS), rubidium hydrogen sulfide (RbHS), calcium hydrogen sulfide (CaHS) and cesium hydrogen sulfide (CeHS).

Sodium hydrogen sulfide and lithium hydrogen sulfide are preferred, with sodium hydrogen sulfide are preferred particularly.

These various alkali metal (hydrogen) sulfides may be used alone or as a combination of one or more.

In addition, as the alkali metal (hydrogen) sulfide, there can be used, a compound obtained by the reaction of hydrogene sulfide and an alkali metal hydroxide.

Further, as the various alkali metal (hydrogen) sulfides, any of the anhydrides, hydrates, aqueous solutions, or hydrous mixtures, etc. can be used. In the case of using a hydrate, aqueous solution or hydrous mixture, a dehydration step has to be applied before the polymerization reaction, as will be described later.

(c) Reaction Between Dihalogenated Aromatic Compound and Alkali Metal (Hydrogen) Sulfide The reaction between the dihalogenated aromatic compound and the alkali metal (hydrogen) sulfide is conducted in a polar solvent in the presence of lithium chloride at a molar ratio, preferably, of 0.75 : 1 - 2.0 : 1, more preferably, from 0.90 : 1 - 1.2 : 1.

(d) Polar Solvent

The polar solvent described above can include organic amides compounds, lactam compounds, urea compounds and organic cyclic phosphor compounds. Specifically, there can be mentioned, N,N-dimethylformamide,
N,N-diethylacetamide,
N,N-dimethyl benzoic acid amide,
caprolactam,
N-ethylcaprolactam,
N-isobutylcaprolactam,
N-n-butylcaprolactam,
N-methyl-2-pyrrolidone,
N-isopropyl-2-pyrrolidone,
N-n-propyl-2-pyrrolidone,
N-cyclohexyl-2-pyrrolidone,
N-methyl-3-methyl-2-pyrrolidone,
N-cyclohexyl-2-pyrrolidone,
N-ethyl-3-methyl-2-pyrrolidone,
N-methyl-3,4,5-trimethyl-2-pyrrolidone,
N-methyl-2-piperidone,
N-isopropyl-2-piperidone,
N-methyl-2-piperidone,
N-ethyl-2-piperidone,
N-isopropyl-2-piperidone,
N-methyl-6-methyl-2-piperidone,
N-methyl-3-ethyl-2-piperidone,
tetramethyl urea,
N,N'-dimethylethylene urea,
N,N'-dimethylpropylene urea,
1-methyl-1-oxosulfolan,
1-ethyl-1-oxosulfolan,
1-phenyl-1-oxosulfolane,
1-methyl-1-oxophospholan,
1-n-propyl-1-oxophospholan and
N,N-dimethylacetamide,
N,N-dipropylacetamide,
N-methylcaprolactam,
N-isopropylcaprolactam,
N-n-propylcaprolactam,
N-cyclohexylcaprolactam,
N-ethyl-2-pyrrolidone,
N-isobutyl-2-pyrrolidone,
N-n-butyl-2-pyrrolidone, 1-phenyl-1-oxophospholan.

These polar solvents may be used alone or as a mixture of two or more.

Among the various polar solvents described above, non-protonic organic amides or lactams are preferred. Among them, N-alkylpyrrolidone is preferred, and N-methyl-2-pyrrolidone is particularly preferred.

(e) Lithium Chloride

Lithium chloride is used as the polymerization agent for the polyarylene sulfide.

The amount of the lithium chloride used is selected within a range from 0.03 to 2.0 mol, preferably, from 0.1 to 1.6 mol based on one mol of the alkali metal (hydrogen) sulfide. If the amount of lithium chloride is less than 0.03 mol, the molecular weight of the resultant polymer is lower or the content of impurity such as sodium chloride present invention in the granular polyarylene sulfide (B) cannot be lowered sufficiently. On the other hand, if it exceeds 2.0 mol, no catalytic effect proportional to the amount can be obtained and lithium chloride will remain at high concentrations in the resultant polymer, which is not preferred.

In the case of when no lithium chloride is used as a polymerization agent or a small amount of lithium chloride is used, and lithium sulfide as raw material is used, said lithium sulfide reacts with the dihalogene aromatic compound and lithium chloride is obtained and acts as polymerization agent, and this is included into this invention.

Referring to the amount of the polar solvent used in the process according to the present invention, it may be such an amount as is sufficient to uniformly proceed with the reaction and there is no particular restrictions. Usually, it is selected within a range from 0.1 to 10 times by weight based on the total weight of the starting ingredients and the polymerization agent. If the amount is less than 0.1 times by weight, the reaction may possibly not be uniform, whereas if it exceeds 10 times by weight, the volumic efficiency is worsened to undesirably reduce the productivity.

(f) Procedure for the Polymerizing Reaction

In the present invention, a polyarylene sulfide is formed in the polar solvent by bringing the dihalogenated compound into contact with the alkali metal (hydrogen) sulfide in the presence of a lithium chloride and the alkali metal (hydrogen) sulfide is in the aqueous solution, hydrous state or a hydrate, it is desirable that the lithium chloride or the alkali metal (hydroqen) sulfide is first added to the polar solvent, and treated with a dehydrating procedure such as an azeotropic distillation or vacuum distillation to prepare a mixed solution. Then, a substantially anhydrous halogenated aromatic compound is added and reacted.

In referring to a preferred example of the reaction between the dihalogenated aromatic compound and the alkali metal (hydrogen) sulfide, the alkali metal (hydrogen) sulfide and the lithium chloride are each added in the required amount in a desired polar solvent, and dehydration is applied, if required, by means of azeotropic distillation or vacuum distillation etc. (at temperatures usually within a range from 100° to 220° C.). Then, the dihalogenated aromatic compound of a predetermined amount and various kinds of additive ingredients used depending on the requirement are added and the polymerization reaction proceeds by heating to a temperature usually within a range from 180° to 330° C. and, preferably, 220° to 300° C. If the reaction temperature is lower than 180° C., the reaction rate is too low for the practical purpose. On the other hand, if it exceeds 330° C., it causes side reactions or degradation in the resultant polymer, causing coloration or gelation.

The reaction time is usually within 20 hours, preferably, about from 0.1 to 8 hours, but it can not simply be determined since it is dependent on the kind and the ratio of the amount of the starting ingredients used, and the kind and the amount of the polymerization agent, etc.

The polymerizing reaction may be conducted in an inert gas atmosphere such as nitrogen, argon, carbon dioxide or steam. Further, although there is no particular restriction to the reaction pressure, the reaction is usually conducted at an autogenous pressure of the polymerizing reaction system such as that of the solvent or at a pressure up to about 50 kg/cm$^2$ (absolute pressure).

In a case where both of the lithium chloride and the alkali metal (hydrogen) sulfide as the starting ingredient are anhydrous, there is no particular restrictions for the order of adding each of the ingredients into the polar solvent. The temperature may either be a one step reaction conducted at an ordinary temperature or a multi-step reaction in which the temperature is elevated stepwise. Furthermore, such a mode of reaction such as continuously elevating the temperature gradually may also be employed.

Removal of Solvent-Insoluble Components from the Reaction Mixture

The reaction mixture obtained as described above contains polymer, oligomer, lithium chloride, alkali metal salt, reaction impurity and organic polar solvent. Depending on the difference between the solubility of each of the ingredients in the organic polar solvent, it can be said that the reaction mixture comprises an organic polar solvent and solvent-insoluble components.

In the case of using lithium (hydrogen) sulfide as the alkali metal (hydrogen) sulfide, the lithium (hydrogen) sulfide forms a solvent-soluble lithium salt after the polymerization reaction. Further, in the case of using sodium (hydrogen) sulfide, etc., as the alkali metal (hydrogen) sulfide, the sodium (hydrogen) sulfide forms a solvent-insoluble sodium salt after the polymerization reaction.

Accordingly, a recovery method for the lithium chloride may be considered depending on the kind of alkali metal salts derived from alkali metal (hydrogen) sulfides.

(1) First Method

In a case where the alkali metal chloride derived from the alkali metal (hydrogen) sulfide is soluble in a polar solvent such as a lithium salt, there can be mentioned a method of recovering a lithium chloride, which comprises separating a solvent-insoluble component from the reaction mixture to obtain a solution and calcinating the residue obtained by removing volatile substances from the resultant solution.

In this case, the solvent-insoluble component usually contains polyarylene sulfide, and impurities insolvent in the polar solvent or lithium chloride and/or polar solvent, etc.

The solution usually contains a polar solvent, lithium chloride, arylene sulfide oligomer, unreacted monomer and impurities as by-product, etc.

As the method of separating the solvent-insoluble component, there can be mentioned, for example, a centrifugal separation method using a centrifugator, a filtration method using a filter, etc. The centrifugal separation method is preferred since clogging due to the solid component does not occur.

In this way, since the solution obtained by separating the solid content from the reaction mixture forms a mixture of an inorganic substance such as lithium chloride and an organic substance such as arylene sulfide oligomer, unreacted monomer and solvent, when the residue obtained by removing the volatile ingredients from the solution is calcinated, lithium chloride is separated as the calcination residue.

Then, the volatile substances usually contain the polar solvent, the unreacted monomer, etc.

Accordingly, as the method of removing the volatile ingredients, there can be used, for example, a flashing method, an evaporation method using a thin layer evaporator, and an evaporation method using a kneading evaporator, etc. Removal of the volatile ingredient is usually conducted by heating under a normal pressure or a reduced pressure, preferably, under a reduced pressure.

In the above mentioned, lithium sulfide is used as alkali metal sulfide. A procedure similar to the above mentioned may be used when a reaction mixture obtained by polymerization reaction using sodium sulfide contains lithium chloride (soluble in a solvent) and sodium chloride (insoluble in a solvent).

In this case, solvent-insoluble components containing sodium chloride is provided by the after treatment, such as washing with water to obtain a purified polymer.

Calcination is conducted by charging the residue into a calcination furnace, and then calcinating at a temperature higher than the decomposing temperature of the arylene sulfide oligomer, etc. (about 350° C.), preferably, higher than 400° C. and below the melting point of the lithium chloride.

If the calcination temperature is lower than the decomposing temperature of the arylene sulfide oligomer, the oligomer cannot sufficiently be gasified, and there is a failure to remove the oligomer. On the other hand, at a temperature higher than the melting point of the lithium chloride, the lithium chloride may be melted to cause evaporation loss or to promote the formation of a lithium oxide, etc. (a side reaction), which is not preferable.

A preferred calcination temperature is usually within a range from 350° to 800° C. and, preferably, from 500° to 700° C.

Further, as the calcination method, there can be used a method of calcinating in air while elevating the temperature from the start (one step calcination method), or a method of calcinating in an inert gas atmosphere such as nitrogen gas while elevating up to the calcination temperature and then calcinating in air (two step calcination method), etc. Since oxidation may occur in the temperature elevating step to possibly increase the by-products in the one step calcination method, the two step calcination method is preferred. Furthermore, as the calcination furnace, a rotary furnace bed type, belt type, kiln type, etc. may be used, but a rotary furnace bed type calcination furnace is preferred in view of the compact structure of the device and its easy operation.

The lithium chloride obtained in this way is a high purity one.

(2) Second Method

The second method is a recovery method for lithium chloride that is particularly suitable in a case where the alkali metal salt derived from the alkali metal (hydrogen) sulfide is insoluble in the solvent.

This method concerns a method of recovering lithium chloride, comprising reacting a dihalogenated aromatic compound and an alkali metal sulfide and/or alkali metal hydrogen sulfide in a polar solvent in the presence of lithium chloride, separating the granular polymer ingredient from the resultant reaction mixture, subjecting the liquid suspension obtained by said separation to a solid-liquid separation and calcinating the residue obtained by removing the volatile substances from the resultant solution component.

For the separation of the polymer ingredient, it is preferred to use a filter that can filtrate only the granular polyarylene sulfide but cannot filter those solid components such as precipitates of alkali metal halide suspended in the reaction mixture because the grain size of the deposited polyarylene sulfide is usually more than 0.05 mm, particularly within a range from 0.05 to 0.5 mm, whereas the grain size of the alkali metal salt is much smaller than that of the polyarylene sulfide. In view of the above, the filter used for the separation is usually from 200 to 5 mesh, preferably, from 100 to 16 mesh. By such filtration, the content of the alkali metal salt residue in the filtrated polyarylene sulfide is extremely small and, if the alkali metal salt is contained, a polyarylene sulfide of high whiteness can be obtained by merely washing the filtrated polyarylene sulfide with water.

In this way, the liquid filtrate comprises a solid component such as a solvent-insoluble alkali metal halide (for example, sodium chloride) in a suspended state and granular polymer, and the solution component containing polar solvent, lithium chloride, low molecular weight arylene sulfide oligomer and unreacted monomer.

Then, the liquid filtrate is subjected to solid-liquid separation.

The solid-liquid separation can be conducted by using, for example, a centrifugal separation method by using a centrifugator, a filtration method, etc. Centrifugation capable of continuous operation with no occurrence of clogging due to the solid component is preferred.

The solution component obtained by the solid-liquid separation is removed with the volatile substances in the same manner as the first method and the residue is then calcinated.

In view of the effective recovery of lithium chloride, it is desired that a granular polymer (including a large grain size polymer) obtained by the above mentioned separation process and containing small amounts of lithium chloride be washed with a polar solvent and a washing solution and added to the above solution component.

Advantage of Invention

According to the present invention, a method of recovering lithium chloride having the following advantages is provided:

(1) lithium chloride used as the polymerization agent can be recovered efficiently, (2) lithium chloride can be recovered by a simple procedure and facility, (3) lithium chloride can be recovered at rate and high purity, and (4) the content of salts in the resultant polyarylene sulfide can be lowered further and the content of impurities soluble in a solvent in the resultant polyarylene sulfide can be reduced to substantially 0.

EXAMPLE

The present invention is described more specifically by referring to examples.

EXAMPLE 1

9.13 kg (54.3 mol) of sodium sulfide 5-hydrate, 2.30 kg (54.3 mol) of lithium chloride and 30 liter of N-methyl-2-pyrrolidone (NMP) were charged in an autoclave and water was distilled off at 160° C. under a reduced pressure. A content of remaining water after distillation was less than it of sodium sulfide 1-hydrate. Ten liter of N-methyl-2-pyrrolidone and 7.98 kg (54.3 mol) of p-dichlorobenzene were added and reacted at 260° C. for three hours to obtain a reaction mixture.

The reaction mixture was cooled, and granular polyphenylene sulfide (granular PPS) was filtered on a 140 mesh stainless steel gauze to separate granular PPS and liquid filtrate. The granular PPS was washed with 20 liter of NMP.

The granular PPS after washing showed 92.5% yield, a inherent viscosity of $\eta_{inh}$ of 0.335 (temperature : 206° C., in α-chloronaphthalene at a concentration of 0.4 g/dl) and 210 ppm of sodium ion content.

By centrifugating the liquid filtrate obtained by filtration to apply solid-liquid separation, sodium chloride was separated from the liquid filtrate.

Volatile ingredients (mainly NMP) were then distilled off by means of an eVaporator from the remaining liquid after separating sodium chloride from the liquid filtrate to obtain a residue.

When the residue was determined quantitatively, it consisted of 83.8% by weight of lithium chloride, 5.2% by weight of NMP and 11.0% by weight of oligomers.

Fifteen kg of the residues was calcinated in a rotary furnace bed type calcination furnace (manufactured by Tamagtawa Kikai Kabushiki Kaisha) under the conditions of a stacked layer thickness of 30 mm, processing temperature of 550° C., nitrogen and air flow rate of 1 Nm$^3$/hr, while keeping them in the furnace at first for two hours under a nitrogen gas stream and then for one hour under an air stream, to obtain 12.5 kg of the calcination residue. The recovery rate (calcination residue/charged amount to the furnace x 100) was 83.3% by weight. When the residue was determined quantitatively, it consisted of 99.1% by weight of LiCl and 0.9% by weight of Li$_2$SO$_4$, from which the organics were substantially completely removed. The results are shown in Table 1.

EXAMPLE 2

The procedures were the same as those in Example 1 except for changing the furnace staying time under air stream to two hours. The results are shown in Table 1.

EXAMPLE 3

The procedures were the same as those in Example 1 except for changing the temperature to 750° C. The results are shown in Table 1.

EXAMPLE 4

The procedures were the same as those in Example 1 except for changing the content of sodium sulfide to 4.56 kg (27.2 mol) and the content of lithium chloride to 1.25 kg (27.2 mol).

The results are shown in Table 1.

TABLE 1

|  | Example 1 | Example 2 | Example 3 | Example 4 |
|---|---|---|---|---|
| Recovery rate (wt %) | 83.3 | 83.0 | 83.7 | 84.0 |
| LiCl content (wt %) | 99.1 | 98.0 | 95.1 | 99.3 |
| $Li_2SO_4$ content (wt %) | 0.9 | 2.0 | 4.9 | 0.7 |

We claim:

1. A method of recovering lithium chloride, comprising reacting a dihalogenated aromatic compound and an alkali metal sulfide and/or alkali metal hydrogen sulfide in a polar solvent in the presence of lithium chloride, separating a solvent insoluble component from the resultant reaction mixture to obtain a solution and calcinating a residue obtained by removing volatile substances from the solution.

2. The method of claim 1, wherein the alkali metal sulfide is lithium sulfide.

3. The method of claim 1, wherein the polar solvent is a lactam.

4. The method of claim 1, wherein the polar solvent is N-methylpyrrolidone.

5. The method of claim 1, wherein the dihalogenated aromatic compound is dihalobenzene.

6. A method of recovering lithium chloride, comprising reacting a dihalogenated aromatic compound and an alkali metal sulfide and/or alkali metal hydrogen sulfide in a polar solvent in the presence of lithium chloride, separating a granular polymer ingredient from the resultant reaction mixture, subjecting a liquid suspension obtained by said separation to solid-liquid separation and calcinating the residue obtained by removing volatile substances from the resultant solution component.

7. The method of claim 6, wherein the alkali metal sulfide is lithium sulfide.

8. The method of claim 6, wherein the polar solvent is a lactam.

9. The method of claim 6, wherein the polar solvent is N-methylpyrrolidone.

10. The method of claim 6, wherein the dihalogenated aromatic compound is a dihalobenzene.

* * * * *

UNITED STATES PATENT AND TRADEMARK OFFICE
CERTIFICATE OF CORRECTION

PATENT NO. : 4,919,911

DATED : April 24, 1990

INVENTOR(S) : Daigo Shirota, Masao Omori, Hiroyasu Yamato and Norio Ogata

It is certified that error appears in the above-indentified patent and that said Letters Patent is hereby corrected as shown below:

Column 2, line 47: change "with" to --from--.

Column 3, line 5: delete comma ",", second occurrence and insert therefor --and--; delete "and lithium"; after "sulfide", insert period --.--.

Column 3, line 6: delete "sulfide."

Column 4, line 20: delete "invention".

Column 4, line 21: delete "(B)".

Column 4, line 26: delete "of".

Column 4, line 30: after "acts as", insert --a--.

Column 5, line 4: delete "the, first occurrence; change "purpose" to --purposes--.

UNITED STATES PATENT AND TRADEMARK OFFICE
CERTIFICATE OF CORRECTION

PATENT NO. : 4,919,911

DATED : April 24, 1990

INVENTOR(S) : Daigo Shiroto, Masao Omori, Hiroyasu Yamoto and Norio Ogata

It is certified that error appears in the above-indentified patent and that said Letters Patent is hereby corrected as shown below:

Column 5, line 26: change "temperature" to --reaction--.

Column 5, line 29: delete "such", first occurrence.

Column 8, line 20: change "it" to --that--; change "liter" to --liters--.

Column 10, line 2: change "lithium" to --sodium--.

Column 10, line 19: change "lithium" to --sodium--.

Signed and Sealed this

Third Day of August, 1993

Attest:

MICHAEL K. KIRK

Attesting Officer

Acting Commissioner of Patents and Trademarks